US011938750B2

(12) United States Patent
Delbes et al.

(10) Patent No.: US 11,938,750 B2
(45) Date of Patent: Mar. 26, 2024

(54) REFILLABLE FREE INK WRITING INSTRUMENT PROVIDED WITH A REMOVABLE TIP

(71) Applicant: SOCIETE BIC, Clichy (FR)

(72) Inventors: Charlotte Delbes, Clichy (FR); Etienne Roudaut, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 156 days.

(21) Appl. No.: 17/634,630

(22) PCT Filed: Oct. 9, 2020

(86) PCT No.: PCT/EP2020/078418

§ 371 (c)(1),
(2) Date: Feb. 11, 2022

(87) PCT Pub. No.: WO2021/069667

PCT Pub. Date: Apr. 15, 2021

(65) Prior Publication Data

US 2022/0348035 A1 Nov. 3, 2022

(30) Foreign Application Priority Data

Oct. 9, 2019 (EP) .................................... 19306317

(51) Int. Cl.

*B43K 5/02* (2006.01)
*B43K 13/00* (2006.01)
*B43K 23/12* (2006.01)

(52) U.S. Cl.

CPC .............. *B43K 5/02* (2013.01); *B43K 13/005* (2013.01); *B43K 23/12* (2013.01)

(58) Field of Classification Search

CPC .......... B43K 5/03; B43K 11/00; B43K 13/00; B43K 13/05; B43K 29/00

See application file for complete search history.

(56) References Cited

U.S. PATENT DOCUMENTS

| | | | | |
|---|---|---|---|---|
| 4,892,428 A | | 1/1990 | Grotsch | |
| 4,952,088 A | * | 8/1990 | Groetsch | B43K 13/00 401/258 |
| 6,599,047 B1 | * | 7/2003 | Lin | B43K 13/005 401/89 |

(Continued)

FOREIGN PATENT DOCUMENTS

| | | | | |
|---|---|---|---|---|
| AU | 2003246113 A1 | | 3/2004 | |
| DE | 4341657 A1 | * | 6/1995 | B43K 11/005 |

(Continued)

OTHER PUBLICATIONS

International Search Report and Written Opinion in International Application No. PCT/EP2020/078418, dated Dec. 15, 2020 (13 pages).

*Primary Examiner* — David P Angwin
*Assistant Examiner* — Bradley S Oliver
(74) *Attorney, Agent, or Firm* — Bookoff McAndrews, PLLC

(57) ABSTRACT

A refillable free ink writing instrument comprising a body having a rear end, a front end and an ink reservoir disposed between the rear end and the front end, a writing tip mounted on the front end, the writing tip having a portion in fluid communication with the ink reservoir, the writing tip being removable from the body for refill.

20 Claims, 4 Drawing Sheets

(56) References Cited

U.S. PATENT DOCUMENTS

| | | | |
|---|---|---|---|
| 6,719,470 B2 | 4/2004 | Berhin | |
| 2023/0311557 A1* | 10/2023 | Bez | B43K 7/02 401/40 |

FOREIGN PATENT DOCUMENTS

| | | | | |
|---|---|---|---|---|
| DE | 4341657 A1 | 6/1995 | | |
| EP | 657306 A1 | 6/1995 | | |
| EP | 1050418 A2 | 11/2000 | | |
| JP | 2002113989 A | 4/2002 | | |
| WO | WO-0172531 A1 * | 10/2001 | | B43K 5/03 |

* cited by examiner

REFILLABLE FREE INK WRITING INSTRUMENT PROVIDED WITH A REMOVABLE TIP

This application is a National Stage application of International Application No. PCT/EP2020/078418 filed on 9 Oct. 2020 and which claims benefit from European patent application EP19306317.9 filed on 9 Apr. 2019, the entire contents of the '317.9 application being incorporated herein by reference.

TECHNICAL FIELD

The present disclosure relates to a refillable free ink writing instrument, a kit comprising said refillable free ink writing instrument and a method for refilling a refillable free ink writing instrument.

A "free ink writing instrument" or "writing instrument having a free ink reservoir" is a writing instrument wherein the ink is free to circulate in the reservoir. In other words, the ink circulates immediately on one side or on the other side of the reservoir, for example due to gravity. In particular, it is understood that the ink may circulate when handling or moving the writing instrument. "Free ink" can be entrained in a fibrous bundle or similar capillary reservoir and hence the term "free ink" cannot exclude nibs impregnated with the ink and the refill containing water.

BACKGROUND

Traditional writing instrument have a limited lifetime, for example because the ink has been used so that the reservoir is empty and/or because the writing tip is worn. Therefore a need exists to provide a writing instrument having an extended lifetime, and which is user-friendly.

SUMMARY

An embodiment relates to a refillable free ink writing instrument comprising a body having a rear end, a front end and an ink reservoir disposed between the rear end and the front end, a writing tip mounted on the front end, the writing tip having a portion in fluid communication with the ink reservoir, the writing tip being removable from the body for refill. The writing instrument further comprises a removable cap that is configured to allow feeding of a refill into the reservoir when the writing tip is removed.

A writing instrument may be a pen, a marker, a writing felt pen, a ball pen, a needle pen, a coloring felt pen, a permanent marker, a dry wipe marker, etc.

The writing tip may be made of felt (for example acrylic, nylon, polyester plus resin, etc.), foam, sintered material such plastic or the like, plastic plus metal tip for ball pen or needle tip pen, etc.

Depending on the ink type, the reservoir may be refilled with ink, water, ink powder and water, concentrated fluid ink and water, solid concentrated ink and water, etc.

When removing the tip (hereafter, and unless otherwise specified, "the tip"), the reservoir may be directly refilled via a conduit extending between the reservoir and the front end, the conduit receiving the portion of the tip in fluid communication with the reservoir. Thus, the free ink writing instrument (hereafter, and unless otherwise specified, "the writing instrument") may be easily refilled, thereby extending its lifetime. In addition, since the tip is configured to be removed, in particular for refilling the reservoir, the tip may be easily replaced when refilling the reservoir. Thus, a worn tip may be easily replaced, thereby extending the lifetime of the writing instrument.

In some embodiments, the body may comprise a nose cone extending along an axial direction and configured to bear the tip, the nose cone comprising the front end of the body, the nose cone having a shoulder configured to cooperate with a complementary shoulder of the writing tip, both the shoulder and the complementary shoulder being perpendicular to the axial direction, the shoulder having at least one recess configured to receive an engaging element for cooperating with the complementary shoulder in order to remove the writing tip from the nose cone.

In some embodiments, the shoulder may comprise two diametrically opposed recesses configured to receive two opposed projections of an engaging element for removing the writing tip from the nose cone.

In some embodiments, the at least one recess may form an open groove.

The open groove may be configured to receive a portion of an engaging element, for example a lamella or the like, by sliding engagement.

In some embodiments, the removable cap may be provided with an engaging element portion for removing the tip.

The engaging element portion may comprise an insertion portion, for example a chamfer or the like, configured to assist the engagement of the engaging element with or in the recess.

In some embodiments, the removable cap may comprise a cap body and a clip portion, the engaging element portion being provided on the clip portion or formed between the clip portion and the cap body.

In some embodiments, the removable cap may comprise a funnel portion designed to feed the refill into the reservoir when the writing tip is removed.

More particularly, the engaging element may function as a plier or key (i.e. used to clamp and pull the tip), as a nut or socket wrench (i.e. used to socket and pull the tip) or simply may be a recess (as shown in FIG. 3 and FIG. 4) that snap-fits in a corresponding portion of the tip, to allow its removal.

In some embodiments, the removable cap may comprise a cap body and a clip portion, a top end of the cap body being in fluid communication with a distal end of the clip portion, the top end of the cap body forming an inlet of the funnel portion while the distal end of the clip portion forms an outlet of the funnel portion.

The top end of the cap body is the end of the body portion which is opposed to the end configured to receive the writing tip for its protection.

In some embodiments, the ink may be a water-based ink.

An embodiment relates to kit comprising the refillable free ink writing instrument according to any one of the embodiments of the present disclosure and at least one replacement writing tip.

In some embodiments, the at least one replacement writing tip may include concentered ink.

For example, the replacement writing tip may comprise a breakable capsule receiving concentered ink. The capsule may be broken when mounting the replacement tip. In another example, concentered ink may be dispersed within the material of the replacement writing ink. In still another example, the tip may include a chamber that contains concentrated ink and that can be opened with water thank to a water-soluble film.

An embodiment relates to a method for refilling a refillable free ink writing instrument comprising: providing the refillable free ink writing instrument according to any one of the embodiments of the present disclosure, removing the writing tip, refilling the reservoir with a refill, and mounting a replacement writing tip.

In some embodiment, the replacement writing tip may include concentered ink while the refill may comprise only water.

Such a refillable free ink writing instrument/kit comprising such a refillable free ink writing instrument/method for refilling such a refillable free ink writing instrument may present an extended lifetime and in a user-friendliness way.

BRIEF DESCRIPTION OF THE DRAWINGS

The disclosure and its advantages can be better understood by reading the detailed description of various embodiments given as non-limiting examples. The description refers to the accompanying sheets of figures, in which.

DETAILED DESCRIPTION

Figure 1:
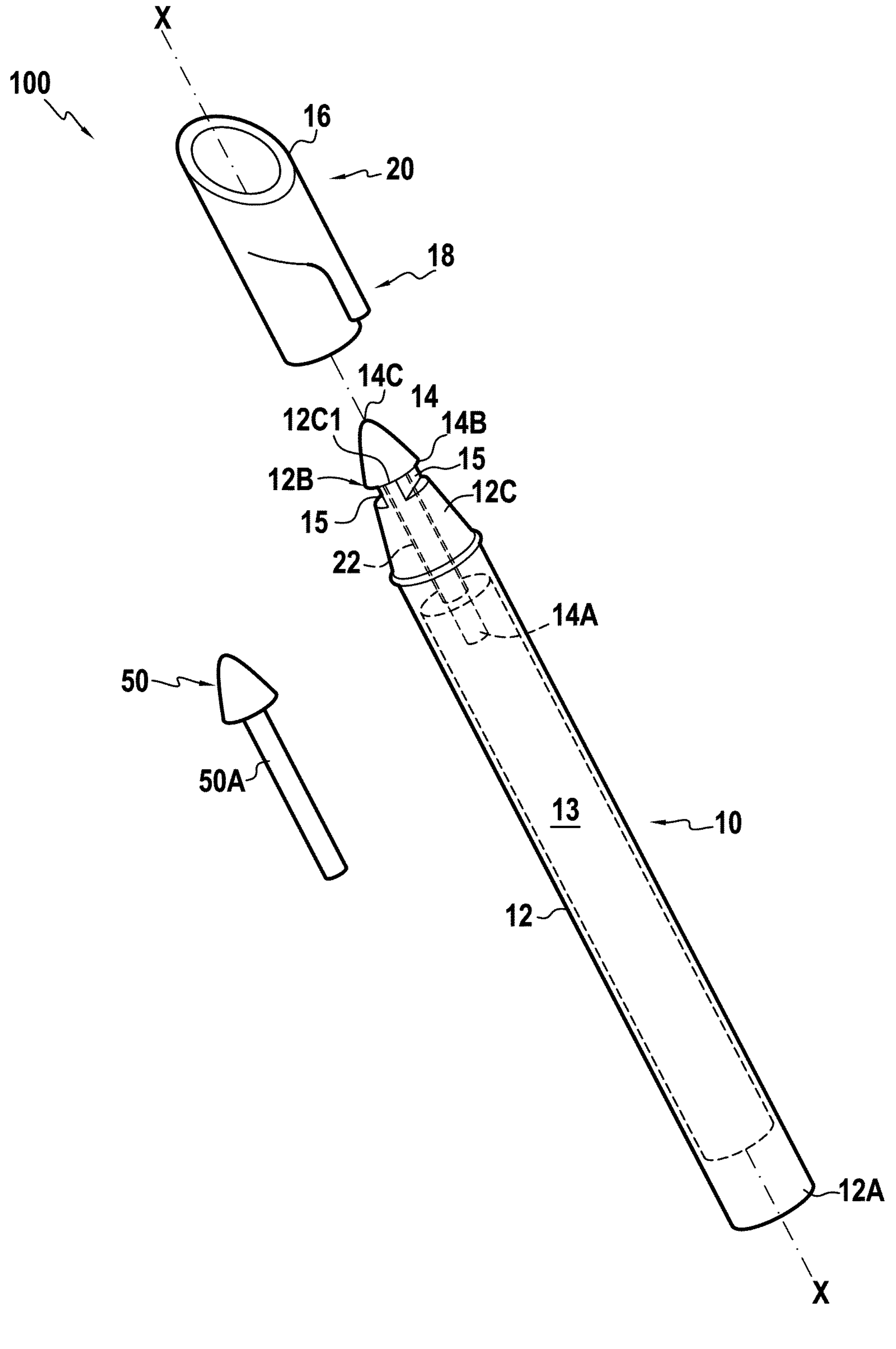
FIG. 1 shows a kit comprising a refillable free ink writing instrument.

FIG. 1 show a kit 100 comprising a refillable free ink writing instrument 10 and a replacement writing tip 50.

Figure 2:
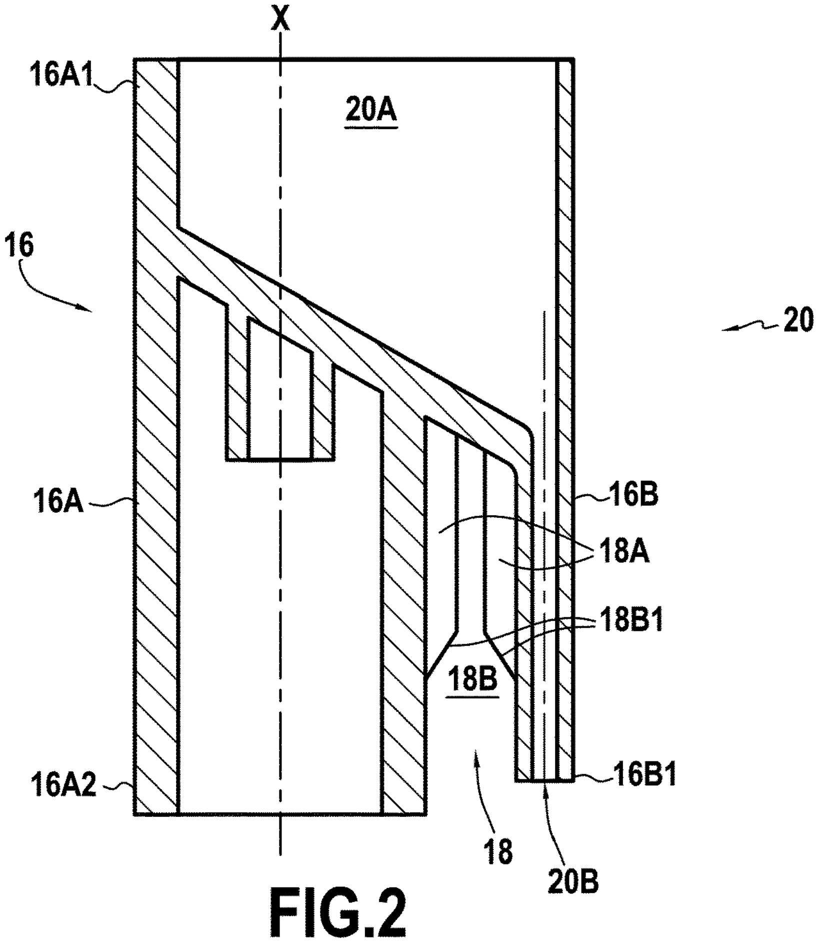
FIG. 2 shows a sectional view along the axial direction of the cap of the free ink writing instrument.

The writing instrument 10, in this example a marker, is described in reference to FIGS. 1 and 2. The writing instrument 10 comprises a body 12 having a rear end 12A, a front end 12B and an ink reservoir 13 disposed between the rear end 12A and the front end 12B. A writing tip 14 is mounted on the front end 12B. The writing tip 14 has a portion 14A in fluid communication with the ink reservoir 13. The tip 14 is mounted on the body 12 so as to be removable. For example, the portion 14A is press fitted within the conduit 22 extending between the front end 12B and the reservoir 13. For example, only the writing tip 14 may be removable, i.e. only the portion which is configured to feed ink from the reservoir 13 toward the distal/writing end 14C used for writing or the like. For example, the tip 14 may be formed of a single piece. The writing instrument 10 comprises a removable cap 16 configured to allow feeding of a refill 24 into the reservoir 13, when the writing tip 14 is removed.

In this example, the body 12 may comprise a nose cone 12C extending along an axial direction X. The axial direction X may be the same for the whole writing instrument 10 and all the different parts of the writing instrument 10. The nose cone 12C may comprise the front end 12B and may be configured to bear the tip 14 so as to be removable.

The nose cone 12C may have a shoulder 12C1 configured to cooperate with a complementary shoulder 14B of the tip 14. The shoulder 12C1 and the complementary shoulder 14B may be perpendicular to the axial direction X. However, the shoulder 12C1 and the complementary shoulder 14B may have other orientations with regard to the axial direction X.

The shoulder 12C1 may have two recesses 15 configured to receive an engaging element, described hereafter, for cooperating with the complementary shoulder 14B in order to remove the writing tip 14 from the nose cone 12C. The two recesses 15 may be diametrically opposed with regard to the axial direction X, and may be configured to receive two opposed projections of the engaging element for removing the writing tip 14 from the nose cone 12C. Each recess 15 may have an open groove shape, for example in order to insert the engaging element in the direction in which the grooves extend, in the present example in a direction perpendicular to the axial direction X. In the present example, the recesses 15 may be seen as flats arranged on the nose cone 12C and extending in a direction perpendicular to the axial direction X. The engaging element for removing the tip 14 may be distinct from the writing instrument 10, or may be formed by a portion of the writing instrument 10.

For example, the engaging element for removing the tip 14 may be formed by an engaging element portion 18 of the cap 16.

The cap 16 may comprise a cap body 16A and a clip portion 16B. As seen in FIG. 2, the engaging element portion 18 may be formed between the cap body 16A and the clip portion 16B. The engaging element portion 18 may comprise two opposite projections 18A facing each other. For example the gap between the two opposite projections is equal or greater than the diameter of the portion 14B. The projections 18A may have a rib shape extending along the axial direction X, the projection 18A of the clip portion 16B extending radially toward the cap body 16A while the projection 18A of the cap body 16A extends radially toward the clip portion 16B. The projections 18A may be hidden by the clip portion 16B, when the cap 16 is viewed laterally. The engaging element portion 18 may comprise an insertion portion 18B comprising chamfers 18B1 arranged in the projection 18A, in order to assist the engagement of the engaging element with the recesses 15.

Figure 3:
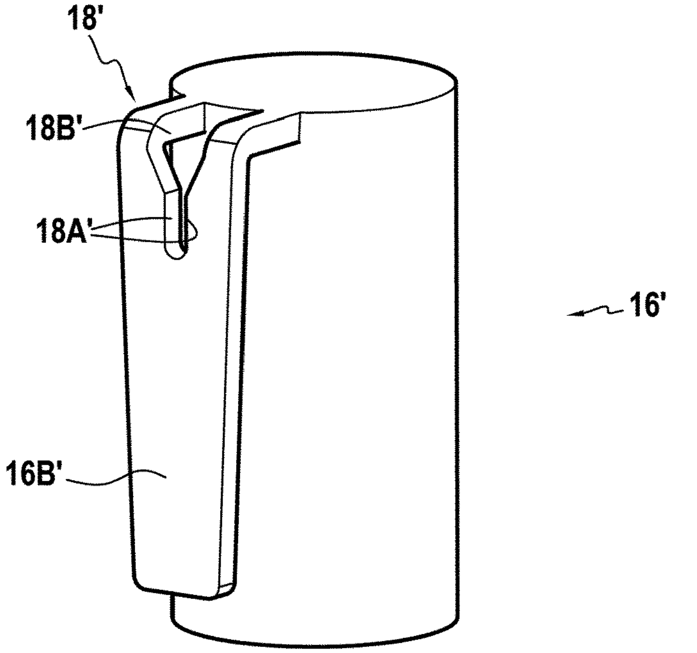
FIG. 3 shows a first modified example of the cap of the free ink writing instrument.

A first modified example of the cap 16', shown in FIG. 3, may comprise an engaging element portion 18' arranged in the clip portion 16B'. The clip portion 16B' may have a lamella shape. The engaging element portion 18' may be formed by molding or by a cutting/machining arranged in the lamella, thereby forming two opposite projections 18A' and an insertion portion 18B'.

Figure 4:
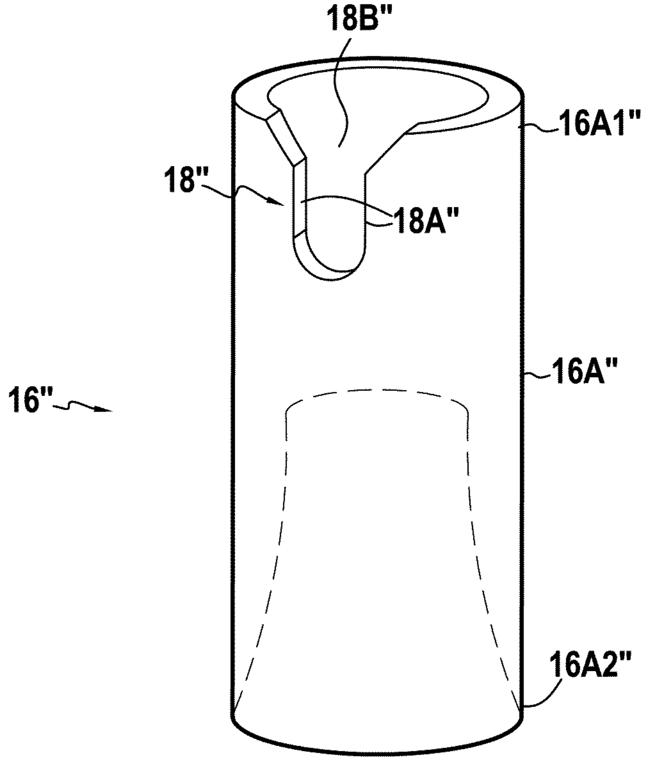
FIG. 4 shows a second modified example of the cap of the free ink writing instrument.

A second modified example of the cap 16", shown in FIG. 4, may be formed in the top end 16A1" of the cap body 16A", opposite to the lower end 16A2" configured to receive the tip 14. The engaging element portion 18" may be formed by molding or by a cutting/machining arranged in the lateral wall (i.e. wall parallel to the axial direction X), thereby forming two opposite projections 18A" and an insertion portion 18B".

Returning to FIG. 2, the cap 16 may comprise a funnel portion 20 configured to feed a refill into the reservoir 13 when the tip 14 is removed.

For example, the top end 16A1 of the cap body 16, which is opposite to the lower portion 16A2 of the cap body 16A, which is configured to receive the tip 14, may be hollow and form an inlet 20A of the funnel portion 20. The clip portion 16B may be hollow and in fluid connection with the top end 16A, the distal end 16B1 of the clip portion forming an outlet 20B of the funnel portion 20. For example, the outer diameter of the distal end 16B1/outlet 20B is lower than the diameter on the conduit 22.

A method for refilling the refillable free ink writing instrument 10 is described in reference to FIGS. 5A to 5D.

For refilling the writing instrument 10, the tip 14 has to be removed, for example with the help of the engaging element portion 18, the reservoir 13 is refilled, for example with the help of the funnel portion 20, and thereafter a replacement tip 50 is mounted instead of the tip 10. In a variant, the reservoir 13 may be refilled but the tip 14 may be not replaced. In another variant, the reservoir 13 may be not refilled but the tip 14 may be replaced.

Figure 5A:
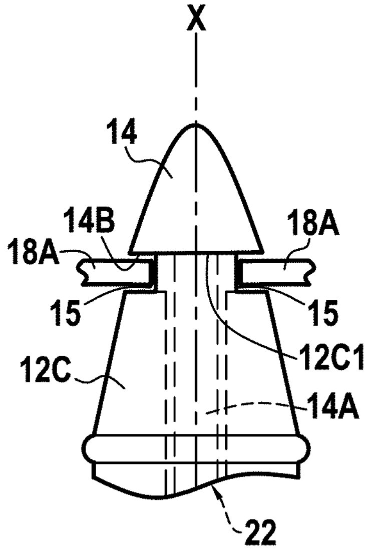
FIG. 5A to 5D show the different steps of a method for refilling the refillable free ink writing instrument.
Figure 5B:
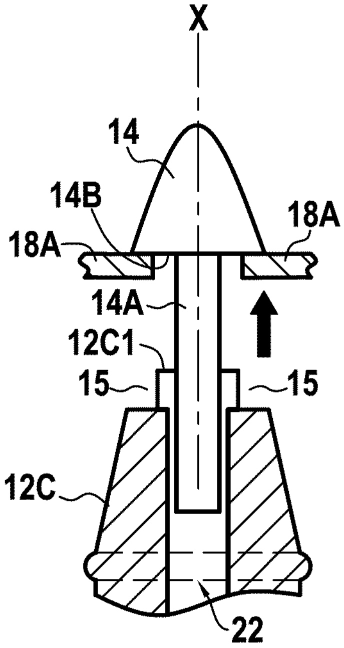

For removing the tip 14, the engaging element portion 18 may be engaged with the recesses 15. As shown in FIG. 5A, the opposite projections 18A are engaged in the respective opposite recesses 15 and cooperate with the complementary shoulder 14B. Thereafter, the engaging element portion 18B is pulled along the axial direction X in order to extract the tip 14 from the body 12, as shown by the arrow in bold in FIG. 5B.

Figure 5C:
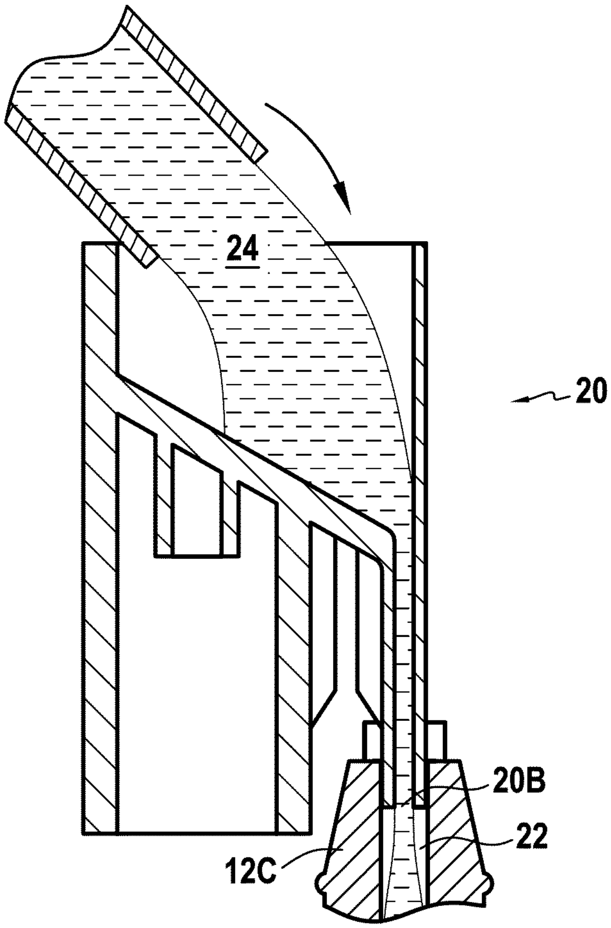

When the tip 14 has been removed, the conduit 22 extending from the front end 12B to the reservoir 13 is free. A refill may be inserted into the reservoir 13 via the conduit 22. The outlet 20B of the funnel portion 20 may be inserted into the conduit 22 and a refill 24 introduced into the reservoir 13, as shown in FIG. 5C. The ink may be water-based ink, and the refill 24 may comprise water only. This may help to keep the funnel portion 20, and more generally the writing instrument 10, clean when refilling.

Figure 5D:
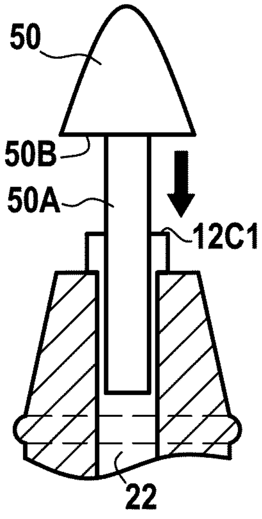

Thereafter, the replacement tip 50 is mounted on the body 12, a portion 50A being inserted into the conduit 22, as shown by the arrow in bold in FIG. 5D. For example, the portion 50 is press fitted within the conduit 22, as far as the complementary shoulder 50B bears against the shoulder 12C1. The replacement tip 50 may include concentered ink, which is mixed with a refill 24 of water, thereby providing a new dose of water based ink.

Although the present disclosure is described with reference to specific examples, it is to be understood that these examples are merely illustrative of the principles and applications of the present disclosure. In particular, individual characteristics of the various embodiments shown and/or mentioned may be combined in additional embodiments. Consequently, the description and the drawings should be considered in a sense that is illustrative rather than restrictive. For example, the caps 16' and 16" may be provided with a funnel portion configured to feed a refill into the reservoir 13 when the tip 14 is removed. For example, the cap 16 may be provided with an engaging element portion 18' or an engaging element portion 18" instead of or in addition to the engaging element portion 18.

Additionally, all of the disclosed features of an apparatus may be transposed, alone or in combination, to a method and vice versa.

It is intended that the specification and the examples be considered as exemplary only, with a true scope of the invention being indicated by the following claims.

The invention claimed is:

1. A refillable free ink writing instrument comprising a body having a rear end, a front end and an ink reservoir disposed between the rear end and the front end, a writing tip mounted on the front end, the writing tip having a portion in fluid communication with the ink reservoir, the writing tip being removable from the body for refill, and wherein:

- the writing instrument further comprises a removable cap, the removable cap being configured to allow feeding of a refill into the reservoir when the writing tip is removed, and
- the removable cap comprises a funnel portion designed to feed a refill into the reservoir when the writing tip is removed.

2. The refillable free ink writing instrument according to claim 1, wherein the body comprises a nose cone extending along an axial direction and configured to bear the tip, the nose cone comprising the front end of the body, the nose cone having a shoulder configured to cooperate with a complementary shoulder of the writing tip, both the shoulder and the complementary shoulder being perpendicular to the axial direction, the shoulder having at least one recess configured to receive an engaging element for cooperating with the complementary shoulder in order to remove the writing tip from the nose cone.

3. The refillable free ink writing instrument according to claim 2, wherein the shoulder comprises two diametrically opposed recesses configured to receive two opposed projections of an engaging element for removing the writing tip from the nose cone.

4. The refillable free ink writing instrument according to claim 2, wherein the at least one recess forms an open groove.

5. The refillable free ink writing instrument according to claim 1, wherein the removable cap is provided with an engaging element portion for removing the writing tip.

6. The refillable free ink writing instrument according to claim 5, wherein the removable cap comprises a cap body and a clip portion, the engaging element portion being provided on the clip portion or formed between the clip portion and the cap body.

7. The refillable free ink writing instrument according to claim 1, wherein the removable cap comprises a cap body and a clip portion, a top end of the cap body being in fluid communication with a distal end of the clip portion, the top end of the cap body forming an inlet of the funnel portion while the distal end of the clip portion forms an outlet of the funnel portion.

8. The refillable free ink writing instrument according to claim 1, wherein the ink is a water-based ink.

9. A kit comprising the refillable free ink writing instrument according to claim 1 and at least one replacement writing tip.

10. The kit of claim 9, wherein the at least one replacement writing tip includes concentred ink.

11. A method for refilling a refillable free ink writing instrument comprising:

- providing the refillable free ink writing instrument according to claim 1,
- removing the writing tip,
- refilling the reservoir with a refill with the removable cap, and
- mounting a replacement writing tip.

12. The method for refilling of claim 11, wherein the replacement writing tip includes concentred ink while the refill comprises only water.

13. The refillable free ink writing instrument according to claim 1, further comprising a conduit extending between the front end and the reservoir.

14. A removable cap configured for feeding a refill in a refillable free ink writing instrument according to claim 1, the removable cap comprising an engaging element portion for removing a writing tip of the writing instrument.

15. The removable cap according to claim 14 comprising a cap body and a clip portion, wherein a top end of the cap body is in fluid communication with a distal end of the clip portion, the top end of the cap body thereby forming an inlet of the funnel portion while the distal end of the clip portion forms an outlet of the funnel portion.

16. A refillable free ink writing instrument comprising a body having a rear end, a front end and an ink reservoir disposed between the rear end and the front end, a writing tip mounted on the front end, the writing tip having a portion in fluid communication with the ink reservoir, the writing tip being removable from the body for refill, and wherein:

the writing instrument further comprises a removable cap, the removable cap being configured to allow feeding of a refill into the reservoir when the writing tip is removed, and the removable cap comprises a funnel portion designed to feed a refill into the reservoir when the writing tip is removed, and the removable cap comprises a cap body and a clip portion, a top end of the cap body being in fluid communication with a distal end of the clip portion.

17. The refillable free ink writing instrument of claim 16, wherein the top end of the cap body forms an inlet of the funnel portion while the distal end of the clip portion forms an outlet of the funnel portion.

18. A refillable free ink writing instrument comprising:

a body having a rear end, a front end and an ink reservoir disposed between the rear end and the front end, a writing tip mounted on the front end, the writing tip having a portion in fluid communication with the ink reservoir, the writing tip being removable from the body for refill, the writing instrument further comprising a removable cap, the removable cap comprising a funnel portion designed to feed a refill into the reservoir when the writing tip is removed, the removable cap:

(1) being configured to allow feeding of a refill into the reservoir when the writing tip is removed, and (2) comprising an engaging element portion for removing a writing tip of the writing instrument.

19. The refillable free ink writing instrument of claim 18, wherein a top end of the cap body is in fluid communication with a distal end of a clip portion.

20. The refillable free ink writing instrument of claim 19, wherein the top end of the cap body forms an inlet of the funnel portion while the distal end of the clip portion forms an outlet of the funnel portion.

* * * * *